TACHOMETER INPUT PHASE COMPARATOR

Filed March 30, 1964 2 Sheets-Sheet 1

INVENTOR
JAMES W. HEBB

BY James H. Griffin

ATTORNEY

INVENTOR
JAMES W. HEBB
BY James H. Griffin
ATTORNEY

United States Patent Office 3,311,755
Patented Mar. 28, 1967

3,311,755
TACHOMETER INPUT PHASE COMPARATOR
James W. Hebb, Mountain View, Calif., assignor to Ampex Corporation, Redwood City, Calif., a corporation of California
Filed Mar. 30, 1964, Ser. No. 355,742
6 Claims. (Cl. 307—88.5)

This invention relates to circuitry for processing information-bearing signals and more particularly to the reduction of the components of the carrier therein.

The invention will be described in connection with a digital to analog converter of the type used in the feedback loop of a high performance servo control system, but it is to be understood that the invention may be applied to any system wherein it is desired to reduced the components of the carrier present in a signal having carrier type components and distinct information-type components. A high performance servo system, such as, for example, the capstan servo of a magnetic tape recorder, has a servo loop beginning with some device which produces pulses directly related to the angular velocity of the capstan and its servomotor. The angular velocity pulses are then applied to a digtal to analog converter or phase comparator circuit and "compared" with reference pulses of very accurate timing, both as to period and phase, to produce an error signal for controlling the servomotor.

The output of a digital to analog converter consists of a square waveform that must be processed through averaging, compensating, and amplifying circuitry in order to convert its information content (i.e. the velocity and phase error correction signal to the servomotor) into usable form. The output waveform is composed of Fourier components or constituent harmonics most of which, including the largest, are irrelevant to the signal information being conveyed. For example, the largest harmonic in a square wave is of greater amplitude peak-to-peak than the square wave itself.

These irrelevant Fourier components are thus "noise" vis-a-vis the true information signal, and impose an extremely unfavorable signal-to-noise ratio upon the servo system, especially where the error is least. Although filtering provides a partial remedy, it is impractical to add the number of filters necessary to minimize the design limitations imposed by the square wave Fourier components.

It is, therefore, a general object of this invention to provide means for raising the signal-to-carrier ratio in circuits such as the above-mentioned servo system, where the carrier is a limitation on precision, gain, and power consumption.

Another object of this invention is to provide means for minimizing the extraneous energy in signal systems when very small signals are present and to make the energy in the carrier wave increase with increases of error, rather than increasing with decreases of error as heretofore.

Another object of this invention is to provide a more precise and sensitive error signal output from a digital to analog converter.

Another object of this invention is to raise the signal-to-carrier ratio in various systems without using numerous filters.

In the achievement of the above objects and as a feature of applicant's invention, the information carrier wave is processed by circuitry designed to add to it duplicates of all the Fourier components that constitute is carrier, but inverted or 180° out of phase. This results in the elimination of most carrier components from the information signal, leaving a net result of zero signal voltage and zero carrier when the error to zero and, as the error increases, a signal and carrier that increases proportionately.

As another feature of applicant's invention, in digital-to-analog converters elimination of carrier components may be accomplished by inverting the time base reference pulses used in the converter and adding them to the output of the converter. Thus, the converter output is zero when the error is zero and, as the error increases, becomes a rectangular wave of increasing energy, so that much smaller errors can be transmitted and responded to by the system of which the converter is a component.

Other objects and features of this invention and a fuller understanding thereof may be had by referring to the following description and claims taken in conjunction with the accompanying drawings, in which:

Figure 1:
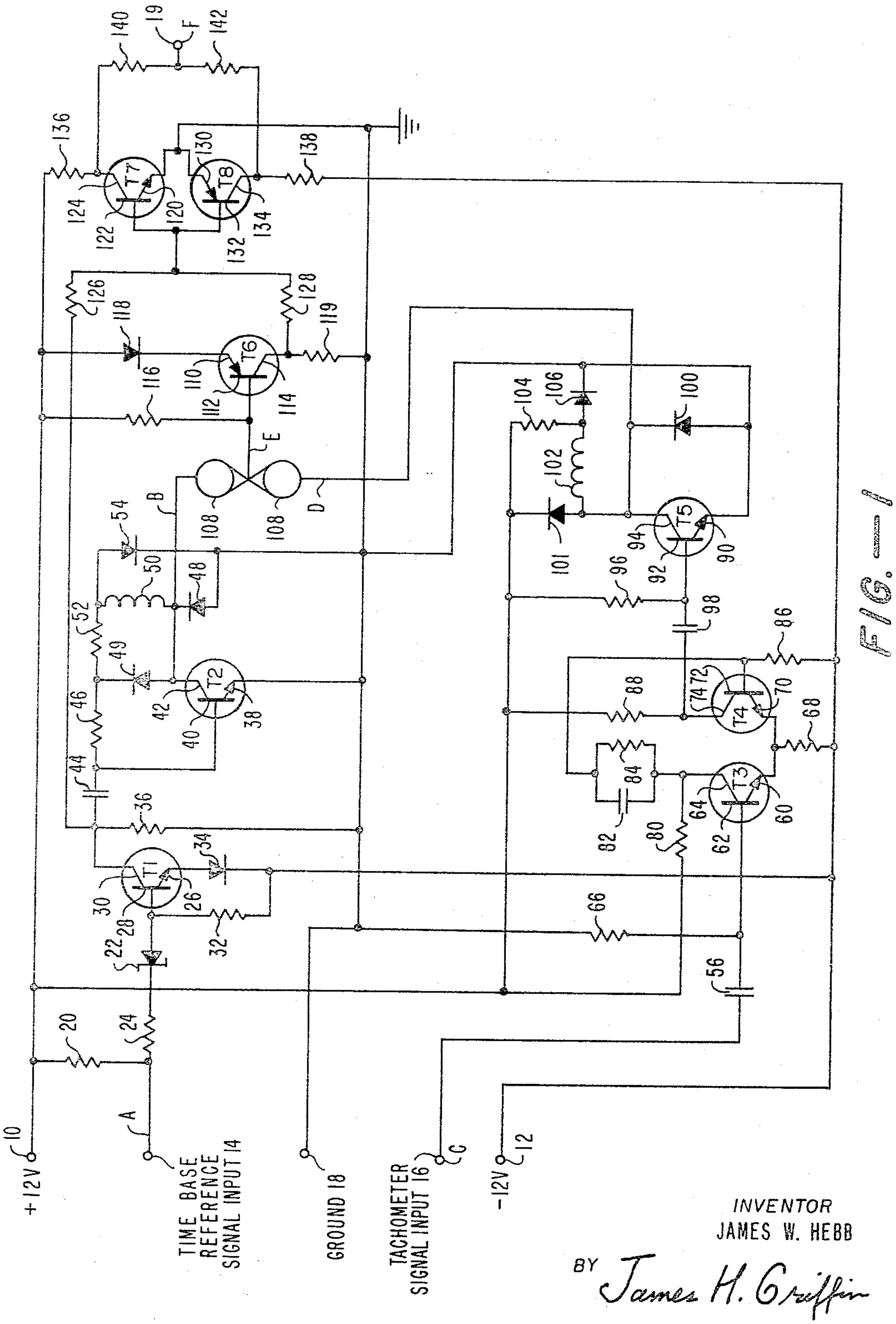
FIGURE 1 is a schematic of a phase comparator or "pulse counter" circuit in which a preferred embodiment of applicant's invention is used.

Referring to FIGURE 1, the circuit shown illustrates one use of applicant's new carrier suppressor and has power supply terminals 10 and 12, a time base reference signal input terminal 14, a tachometer signal input terminal 16, a ground terminal 18, and an output terminal 19. For purposes of illustration, the power supply terminals 10 and 12 are specified as +12 volts and −12 volts, respectively.

The time base input terminal 14 is coupled to the power supply 10 through a resistor 20 and to a Zener diode 22 through a resistor 24. A transistor T1 having emitter 26, base 28, and collector 30 has its base 28 coupled to the Zener diode 22 and also to a resistor 32 to the power supply 12. The emitter 26 is coupled to the power supply 12 through a diode 34. The collector 30 is coupled to ground through a resistor 36.

A transistor T2 has emitter 38, base 40, and collector 42. The base 40 is coupled to the collector 30 of the transistor T1 through a capacitor 44 and is also coupled to the power supply 10 through a resistor 46. The emitter 38 is directly coupled to ground. The collector 42 is coupled to ground through a diode 48 and is coupled to the power supply 10 both through a diode 49 and through an inductor 50 and a resistor 52 in series. A diode 54 is coupled between ground 18 and the junction between the inductor 50 and the resistor 52.

Signals appearing at the tachometer input terminal 16 pass through a capacitor 56. Two transistors T3 and T4 have emitters 60, 70, bases 62, 72, and collectors 64, 74, respectively, the base 62 of the transistor T3 being directly coupled to the capacitor 56 and being coupled through a resistor 66 to ground 18. The emitters 60 and 70 of the transistors T3 and T4 are directly joined and are coupled to the power supply 12 through a resistor 68. The collector 64 of the transistor T3 is coupled to the power supply 10 through a resistor 80 and is also coupled to the base 72 of the transistor T4 through the parallel combination of a capacitor 82 and a resistor 84. The base 72 of the transistor T4 is coupled to the power supply 12 through a resistor 86. The collector 74 of the transistor T4 is coupled to the power supply 10 through a resistor 88.

A transistor T5 having emitter 90, base 92, and collector 94, has its base 92 coupled through a resistor 96 to the power supply 10 and through a capacitor 98 to the collector 74 of the transistor T4. The emitter 90 of the transistor T5 is directly coupled to ground. The collector 94 of the transistor T5 is coupled to ground through a diode 100 and is coupled to the power supply 10 both through a diode 101 and through the series combination of an inductor 102 and a resistor 104. A diode 106 appears between ground and the junction between the inductor 102 and the resistor 104.

The collector 42 of the transistor T2 and the collector 94 of the transistor T5 are directly coupled to separate input terminals of a conventional bistable multivibrator, shown schematically at 108. The bistable multivibrator 108 serves as the basic pulse counter or phase comparator component of applicant's illustrative circuit; the other components serve to shape the input signals to the multivibrator and the output signals therefrom into optimumly usable form. The output of the bistable multivibrator 108 is applied to the input electrode of a transistor T6 which has an emitter 110, base 112, and collector 114. The base 112 is the control electrode to which the signal from the bistable multivibrator 108 is applied. The base 112 is coupled to the power supply 10 through a resistor 116. The emitter 110 is coupled to the power supply 10 through a diode 118. The collector 114 of the transistor T6 is coupled to ground 18 through a resistor 119.

Two transistors T7 and T8 having emitters 120, 130, bases 122, 132, and collectors 124, 134, respectively, have their bases 122 and 132 directly joined and coupled to the collector 30 of the transistor T1 through a resistor 126 and to the collector 114 of the transistor T6 through a resistor 128. The collector 124 of the transistor T7 is coupled to the power supply 10 through a resistor 136. The collector 134 of the transistor T8 is coupled to the power supply 12 through a resistor 138. The emitters 120, 130 of the transistors T7 and T8 are directly joined and are coupled to ground 18. The collector 124 of the transistor T7 is coupled to the output terminal 19 through a resistor 140, and the collector 134 of the transistor T8 is coupled to the output terminal 19 through a resistor 142.

Figure 2:
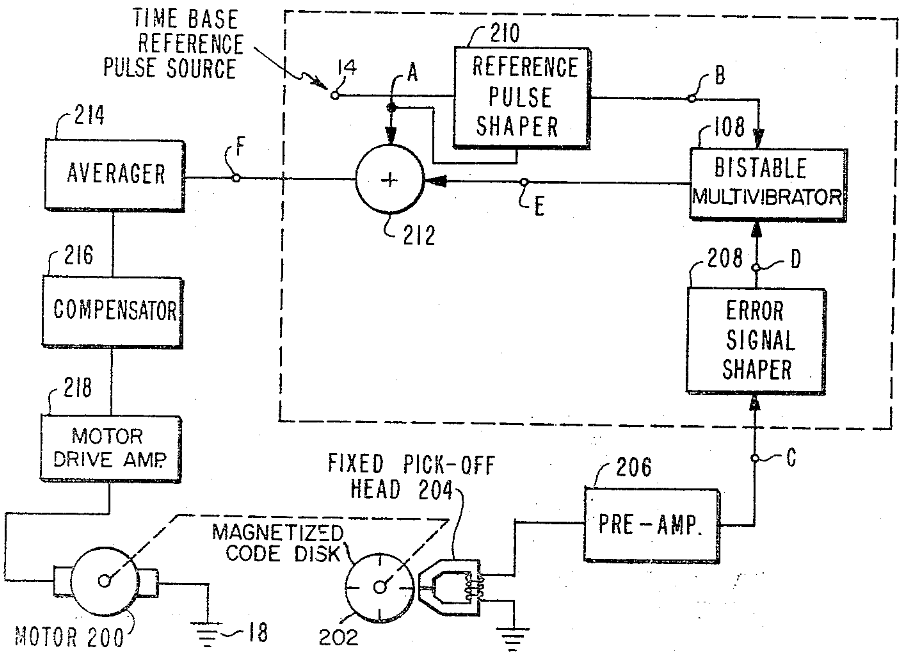
FIGURE 2 is a block diagram of a servo system in which applicant's invention is useful.

Referring to FIGURE 2, the block diagram therein shows a complete servo loop of the sort wherein the phase comparator used to illustrate applicant's invention could be used. The components of the loop that appear in the schematic of FIGURE 1 are enclosed by the dotted line. The object of the loop is to supply accurate control signals to a servomotor 200. The tachometer portion of the loop consists of a magnetized code disk 202 rotating with the motor 200 and a fixed pick-off transducer 204 deriving a signal from each passing lined portion of the code disk 202. The tachometer signal is amplified at 206 to produce the rectangular wave signal shown in FIGURE 3C, after which a tachometer signal shaper 208 derives a spike wave as shown in FIGURE 3D from the leading edge of each negative going pulse wave C. The spike waves D are applied to one side of the bistable multivibrator 108.

The time base reference pulses applied to the terminal 14 are shown in FIGURE 3A. As with the tachometer pulse waveform C, the waveform A is passed through a pulse shaper 210 to produce the spike waveform B, which is applied to the other side of the bistable multivibrator 108. The bistable multivibrator 108, switching with each triggering at an alternate input terminal, produces the waveform shown at FIGURE 3E in response to the alternate spikes from points B and D. The leading edge of each negative going pulse of the waveform E is the response to the spike B, which switches the bistable multivibrator 108 to its more negative mode; the trailing edge of each negative going pulse of the waveform E is the response to the spike D, which switches the bistable multivibrator 108 back to its more positive mode. Since the spike waves B are a time base reference, the regularity and accuracy of their appearance will continue unchanged. The spike waves D, on the other hand, though ideally (i.e., when the motor 200 is in phase) 180° out of phase with the spike waves B, will often appear slightly before or slightly after their ideal position, depending on whether the motor 200 is leading or lagging its proper phase. When there is no phase error in the rotation of the motor 200, the pulses shown at FIGURE 3E should be mirror images of the pulses shown at FIGURE 3A. When there is a phase lag in the motor rotation, the spike waves D will appear slightly behind their no error position as shown at D′. The result will be delayed switching of the bistable multivibrator 108, so that the negative going output pulses of the multivibrator are longer in duration, as shown at E′. Conversely, when the motor phase is running slightly ahead of ideal, the spike waves will appear slightly early, as at D″, and the negative going output pulses of the bistable multivibrator 108 will be slightly shorter than for the no error condition, as shown at E″.

The waveforms from point A are subtracted from the waveforms appearing at point E by phase inversion in the shaper 210 and then summing at 212; the result is shown at FIGURE 3F. When there is no phase error in the rotation of the motor 200, nothing appears at point F; for then the waveform E is identical to the waveform A and their subtraction results in a zero volt signal. The subtraction of the waveform A from the phase lag pulses E′ results, however, in a short negative-going pulse at the point F′ of FIGURE 3F. The phase lead pulses E″, when decreased by the pulses from point A, yield the short positive-going pulses shown at F″. The signals from point F are fed to an averager 214 wherein they are smoothed to a variable D.C. waveform. Thereafter they are compensated at compensator 216 for various irregularities and nonlinearities of the servo loop, and finally the motor drive amplifier 218 raises them to a level sufficient to power the motor 200.

Figure 3:
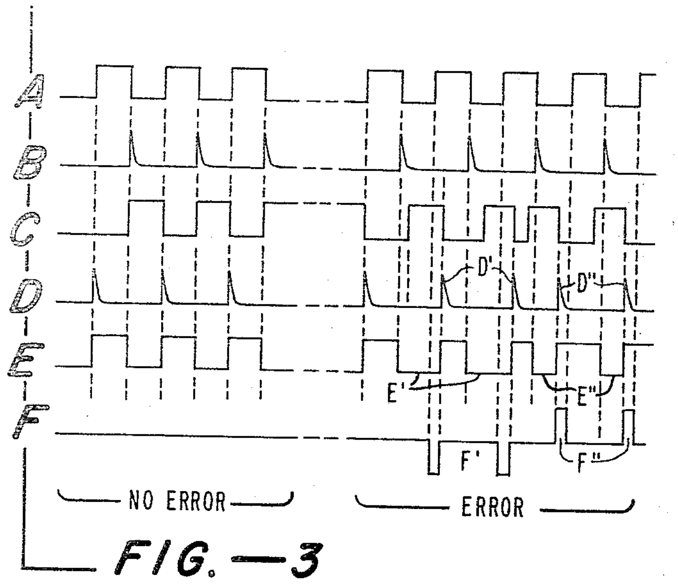
FIGURE 3 sets forth illustrative waveforms at various points in the schematic of FIGURE 1.

In the operation of the circuit shown schematically in FIGURE 1 and described above, the input waveforms appearing at the time base input terminal 14 are the square waves shown in FIGURE 3A. The input waveform at the tachometer input terminal 16 is illustrated in FIGURE 3C. The output pulses of the pulse shaping circuits 208, 210, the input to the bistable multivibrator 108, are shown in FIGURE 3, waveforms D (tachometer information from the shaper 208) and B (time base reference signal from the shaper 210), respectively.

The square wave A is readjusted to the voltage level of the circuitry to follow by the Zener diode 22. Since the square wave A switches the Zener diode 22 to the voltage level corresponding to its conductive state and holds it there for the duration of each pulse, the effect is to transmit the square wave A to the circuitry to follow with a new amplitude, that of the Zener voltage. Since noise and other spurious signals will rarely be large enough to switch on the Zener, their influence upon the subsequent stages of the circuit is effectively blocked.

The pulses from the Zener diode 22 are applied to the base 28 of the transistor T1. The transistor T1 is of the N-P-N conductivity type and has its emitter 26 maintained at −12 volts. Thus, the positive voltage from the Zener 22 at the base 28 results in the collector 30 of the transistor T1 going negative to very near −12 volts, effecting a phase inversion of the waveform A. In this manner, the inverse of the waveform A is applied both to the joined bases of the transistors T7 and T8 and to capacitor 44.

When the leading edge of the inverse of the waveform A appears at the collector 30 of the transistor T1, the R-C combination of the capacitor 44 and the resistor 46 produces a negative going differential spike in response, thereto, on the base 40 of the transistor T2. Likewise, the trailing edge of the inverse of the waveform A results in a positive going differential spike appearing on the base 40 of the transistor T2. The bias of the transistor T2 is such that in the absence of signal it is in its conductive state, and its collector 42 is directly coupled to one input terminal of the multivibrator 108. Because of the diode 48 being conductive to all current flow from ground to the collector 42, however, no signals negative of ground can appear at the collector 42, and in like manner, the diode 49 prevents the voltage level in the positive direction from rising above that of the power supply 10. The effect of the inductor 50 is to steepen the leading edge of the differential waveform produced by the capacitor 44, resulting in the waveform shown in FIGURE 3B, which will have a clearly defined switching time when applied to the bistable multivibrator 108.

The tachometer signal input pulses appearing at the terminal 16 are applied across the capacitor 56 to the base 62 of the trainsistor T3. The transistor T3, being of the N-P-N conductivity type and having its emitter 60 coupled to the negative power supply while its base 62 is coupled to ground 18, is normally conductive in the absence of signal. The values of the resistors 68 and 80 is such that the joined emitters 60, 70 of the transistors T3, T4 are held just below the potential of ground 18, and the collector 64 of the transistor T3 is at approximately the same voltage as the joined emitters 60, 70. Thus, the base 72 of the transistor T4 is held below the level of the emitter 70 of the transistor T4, and the transistor T4, being of the N-P-N conductivity type, is normally cut off.

The leading edge of a pulse at point C would not serve to turn on the transistor T4, but the negative going or trailing edge of the pulse will initially drive the voltage impressed on the base 62 by the capacitor 56 below zero and thus will cut off the transistor T3. Once the transistor T3 cuts off, the voltage at its emitter 60 will drop, and the voltage at its collector 64 will rise. Accordingly, there will be a simultaneous drop in the voltage of the emitter 70 of the transistor T4 and rise in the voltage of the base 72 of the transistor T4, resulting in instantaneous switching of the transistor T4 to the conductive state. During the time that the transistor T4 was cut off, its collector 74 was at the potential of the power supply 10. When the transistor T4 switches to the conductive state, the voltage at its collector 74 drops to substantially the same voltage as its emitter 70; due to the voltage division performed by the resistors 68 and 88, this voltage is within a few volts of ground. The voltage drop at the collector 74 of the transistor T4 is applied across the capacitor 98 to produce the negative-going spike on the base 92 of the transistor T5.

When the signal at the base 62 of the transistor T3 rises again to a point in excess of the voltage of the joined emitters 60, 70, the transistor T3 returns to the conductive state. The collector 64 then drops from the voltage caused by current flow in the resistors 80, 84, and 86 to substantially the voltage of the emitter 60 of the transistor T3. Due to the speed-up effect of the capacitor 82, the voltage drop of the collector 64 is immediately impressed upon the base 72, switching the transistor T4 off. The collector 74 of the transistor T4 then rises to the voltage of the positive power supply 10, resulting in a positive spike at the base 92 of the transistor T5.

The transistor T5 is of the N-P-N conductivity type and will be normally conductive, since its emitter is grounded while its base is coupled to the positive power supply 10. Thus the differential spikes from the capacitor 98 would appear on the collector 94 with a certain degree of amplification; but negative-going spikes are grounded through the diode 100, and the positive-going spikes cannot exceed the value of the positive power supply because of the coupling of the diode 101. The inductor 102 straightens up the leading edges of the differential spikes, in the same manner described in connection with the inductor 50, resulting in the waveform D appearing at one input terminal of the bistable multivibrator 108.

The output of the bistable multivibrator 108 is the waveform shown at FIGURE 3E, each square pulse beginning with one switching of the bistable multivibrator and ending with another switching, each alternate switching being triggered by a pulse at, alternately, point B or D. The multivibrator output E is applied through the normally conductive transistor T6 to the joined bases 122, 132 of the transistors T7, T8.

The transistor T7 is of N-P-N conductivity type and has its collector 124 coupled to the positive power supply 10 and its emitter 120 directly coupled to ground. The transistor T8 is of P-N-P conductivity type and has its collector 134 coupled to the negative power supply 12 and its emitter 130 directly coupled to ground. Thus a positive-going signal at the joined bases 122, 132 of the two transistors T7, T8 will induce conductivity in the transistor T7 and cut off the transistor T8; while a negative-going signal has the opposite effect—cut off of T7, conductivity in T8. Whichever of the transistors T7, T8 is conductive will approach ground 18 at its collector, 124 or 134; the other of the two will have a collector voltage more near its respective power supply, 10 or 12. Accordingly, the last step in the operation of the circuit shown schematically in FIGURE 1 is that the summation of the signals on the collectors 30 of the transistor T1 (the inverse of the waveform 3(A)) and 114 of the transistor T6 (the waveform 3(E)), appearing on the joined bases 122, 132, will produce a voltage near ground in one of the collectors 124, or 134, thus altering the near-zero potential maintained at the output terminal 19 by the voltage division of the resistors 136, 140, 142, and 138. A summation less than zero will render the transistor T8 conductive, so that the resistors 136, 140, and 142 divide between the positive power supply 10 and approximately zero, causing a rise in voltage at the output 19. Similarly, a summation greater than zero will render the transistor T7 conductive, so that the resistors 138, 140, and 142 divide between the negative power supply 12 and approximately ground 18 to produce a drop in voltage at the output 19. The overall result is the waveform shown at FIGURE 3F, the output of the phase comparator circuit shown schematically in FIGURE 1. The waveform 3F retains the information content of waveform 3(E), while eliminating the carrier waveform 3(A). In this embodiment of applicant's invention, the carrier was eliminated by adding a waveform that could be characterized either as the inverse of the carrier or as the carrier 180° out of phase, although with non-symmetrical waveforms only inversion will serve the purpose.

A phase comparator circuit in accordance with the above description and drawing was built and operated using the following components:

| | |
|---|---|
| Voltages: | |
| 10, volts | +12 |
| 12, volts | −12 |
| Transistors: | |
| T1 | SM1170 |
| T2 | SM1170 |
| T3 | SM1170 |
| T4 | SM1170 |
| T5 | SM1170 |
| T6 | SM1542 |
| T7 | SM1170 |
| T8 | SM1542 |
| Diodes: | |
| 22 | 1N756 |
| 34 | FD2022 |
| 48 | FD2022 |
| 49 | FD2022 |
| 54 | FD2022 |
| 100 | FD2022 |
| 101 | FD2022 |
| 106 | FD2022 |
| 118 | FD2022 |
| Resistors (ohms): | |
| 20 | 30K |
| 24 | 10K |
| 32 | 10K |
| 36 | 1.5K |
| 46 | 10K |

Resistors (ohms):

| | |
|---|---|
| 52 | 270 |
| 66 | 2K |
| 68 | 1.3K |
| 80 | 1.5K |
| 84 | 15K |
| 86 | 30K |
| 88 | 1.5K |
| 96 | 10K |
| 104 | 270 |
| 116 | 2.4K |
| 119 | 4.7K |
| 126 | 10K |
| 128 | 10K |
| 136 | 510 |
| 138 | 510 |
| 140 | 10K |
| 142 | 10K |

Capacitors (microfarads):

| | |
|---|---|
| 44 | $600\times10^{-6}$ |
| 56 | 1.0 |
| 82 | $24\times10^{-6}$ |
| 98 | $600\times10^{-6}$ |

Inductors (microhernies):

| | |
|---|---|
| 50 | 27 |
| 102 | 27 |

The circuit as defined above was operated with input pulses of approximately 12 volts amplitude and achieved a carrier suppression factor of better than 36 db. Thus, applicant has provided means for reducing the carrier components and the amount of extraneous energy in circuits such as the above described servo system, where carrier components are a severe limitation on precision and especially on the capacity for resolving small signals, and this has been done without the use of filters although filtering can be used to further clean up the signal before it is supplied to the motor drive amplifier 218.

A number of alternative arrangements will readily suggest themselves to those skilled in the art. For example, N-P-N conductivity type transistors and P-N-P conductivity type transistors may be interchanged, if only the power supply, biasing elements, and other circuit components are appropriately reversed. However, although the invention has been described with a certain degree of particularity, it is to be understood that the present disclosure has been made only by way of example and that numerous changes in the details of construction and the combination and arrangement of parts may be resorted to without departing from the spirit and the scope of the invention as hereinafter claimed.

What is claimed is:

1. A phase comparator comprising: a time base input terminal, a tachometer input terminal, an error signal output terminal, a conventional bistable multivibrator having two input terminals and an output terminal, one input terminal being coupled to the time base input terminal, the other input terminal being coupled to the tachometer input terminal, a first transistor having emitter, base, and collector, the base of the first transistor being coupled directly to the output terminal of the bistable multivibrator, and second and third transistors, each having emitter, base, and collector, the emitters of the second and third transistors being directly joined, the bases of the second and third transistors being directly joined and coupled to the time base input terminal and to the collector of the first transistor, the collector of the second transistor being coupled through a first resistor to said error signal output terminal and the collector of the third transistor being coupled through a second resistor to the error signal output terminal.

2. A phase comparator comprising: a time base input terminal, a tachometer input terminal, a time base reference pulse differentiating circuit having input terminal and output terminal, the input terminal of the time base reference pulse differentiating circuit being coupled to the time base input terminal, a tachometer signal pulse differentiating circuit having input terminal and output terminal, the input terminal of the tachometer signal pulse differentiating circuit being coupled to the tachometer input terminal, a bistable multivibrator having two input terminals and an output terminal, one input terminal being coupled to the output terminal of the time base reference pulse differentiating circuit, the other input terminal being coupled to the output terminal of the tachometer signal pulse differentiating circuit, and means for subtracting the signal at the time base input terminal from the signal at the multivibrator output terminal.

3. A phase comparator comprising: a time base input terminal, a tachometer input terminal, a time base reference pulse differentiating circuit having input terminal and output terminal, the input terminal of the time base reference pulse differentiating circuit being coupled to the time base input terminal, a tachometer signal pulse differentiating circuit having input terminal and output terminal, the input terminal of the tachometer signal pulse differentiating circuit being coupled to the tachometer input terminal, a bistable multivibrator having two input terminals and an output terminal, one input terminal being coupled to the output terminal of the time base reference pulse differentiating circuit, the other input terminal being coupled to the output terminal of the tachometer signal pulse differentiating circuit, and two transistors, each having an emitter, base, and collector, the emitters being directly joined, the bases being directly joined and coupled both to the time base input terminal and to the multivibrator output terminal.

4. A phase comparator comprising: a time base input terminal, a tachometer input terminal, an output terminal, a Zener diode coupled to the time base input terminal, a first transistor having emitter, base, and collector, the base of the first transistor being coupled to the Zener diode, a time base reference pulse differentiating circuit having input terminal and output terminal, the input terminal of the time base reference pulse differentiating circuit being coupled to the collector of the first transistor, a tachometer signal pulse differentiating circuit having input terminal and output terminal, the input terminal of the tachometer signal pulse differentiating circuit being coupled to the tachometer input terminal, a bistable multivibrator having two input terminals and an output terminal, one input terminal being coupled to the output terminal of the time base reference pulse differentiating circuit, the other input terminal being coupled to the output terminal of the tachometer signal pulse differentiating circuit, a second transistor having emitter, base, and collector, the base of the second transistor being coupled to the output terminal of the bistable multivibrator, third and fourth transistors, each having emitter, base, and collector, the emitters of the third and fourth transistors being directly joined and coupled to ground, the bases of the third and fourth transistors being directly joined and coupled through a first resistor to the collector of the first transistor and through a second resistor to the collector of the second transistor, the collector of the third transistor being coupled through a third resistor to the output terminal, and the collector of the fourth transistor being coupled through a fourth resistor to the output terminal.

5. A phase comparator comprising: a time base input terminal, a tachometer input terminal, a positive power supply terminal, a negative power supply terminal, a ground terminal, an output terminal, a first resistor coupled between the time base input terminal and the positive power supply, a second resistor coupled between the time base input terminal and a Zener diode, a first transistor having emitter, base, and collector, the base of the first transistor being coupled to the Zener diode and through a third resistor to the negative power supply, the emitter of the first transistor being coupled through a first diode to the negative power supply, and the collector of the first transistor being coupled through a fourth resistor to ground, a time base reference pulse differentiating circuit having input terminal and output terminal, the input terminal of the time base reference pulse differentiating circuit being coupled to the collector of the first transistor, a tachometer signal pulse differentiating circuit having input terminal and output terminal, the input terminal of the tachometer signal pulse differentiating circuit being coupled to the tachometer input terminal, a conventional bistable multivibrator having two input terminals and an output terminal, one input terminal being coupled to the output terminal of the time base reference pulse differentiating circuit, the other input terminal being coupled to the output terminal of the tachometer signal pulse differentiating circuit, a second transistor having emitter, base, and collector, the emitter of the second transistor being coupled through a fifth resistor to the positive power supply, the base of the second transistor being coupled directly to the output terminal of the bistable multivibrator and through a sixth resistor to the positive power supply, the collector of the second transistor being coupled through a seventh resistor to ground, and third and fourth transistors, each having emitter, base, and collector, the emitters of the third and fourth transistors being directly joined and coupled to ground, the bases of the third and fourth transistors being directly joined and coupled through an eighth resistor to the collector of the first transistor and through a ninth resistor to the collector of the second transistor, the collector of the third transistor being coupled through a tenth resistor to the positive power supply and through an eleventh resistor to the output terminal, and the collector of the fourth transistor being coupled through a twelfth resistor to the negative power supply and through a thirteenth resistor to the output terminal.

6. A phase comparator comprising: a reference signal source for generating time base reference signal, a phase information source for generating phase information signals, means coupled to the reference signal source and to the phase information signal source for switching between one voltage level and another voltage level alternately in response to the time base reference sginals and the phase information signals, and means for subtracting the time base reference signals from the output of the switching means.

References Cited by the Examiner

UNITED STATES PATENTS

| | | | |
|---|---|---|---|
| 2,490,500 | 12/1949 | Young. | |
| 2,866,092 | 12/1958 | Raynsford | 328—109 X |
| 3,100,875 | 8/1963 | Peterson | 329—128 X |
| 3,235,800 | 2/1966 | Turrell | 328—134 X |
| 3,243,791 | 3/1966 | Currie | 329—50 X |

ROY LAKE, *Primary Examiner.*

ALFRED L. BRODY, *Examiner.*